Oct. 23, 1945.  G. E. BOCK  2,387,230
VARIABLE SPEED HYDRAULIC COUPLING
Filed March 23, 1944  7 Sheets-Sheet 1
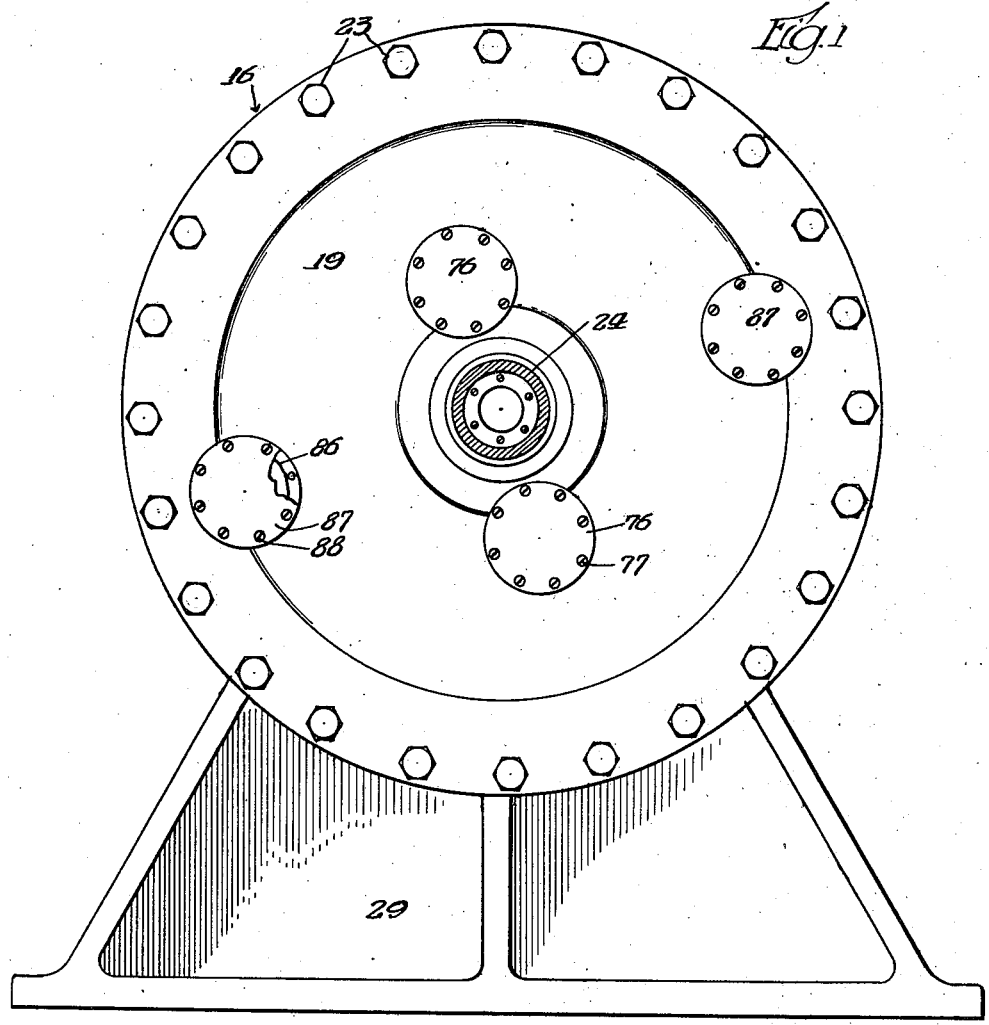
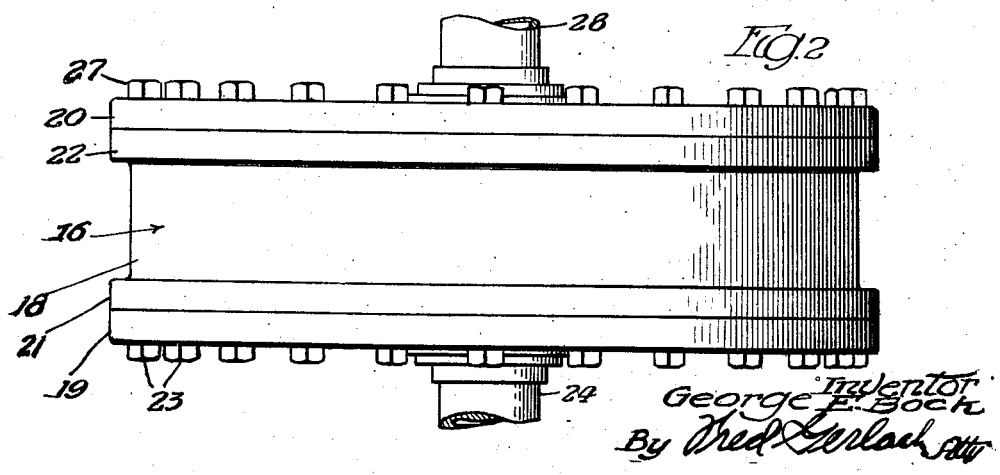

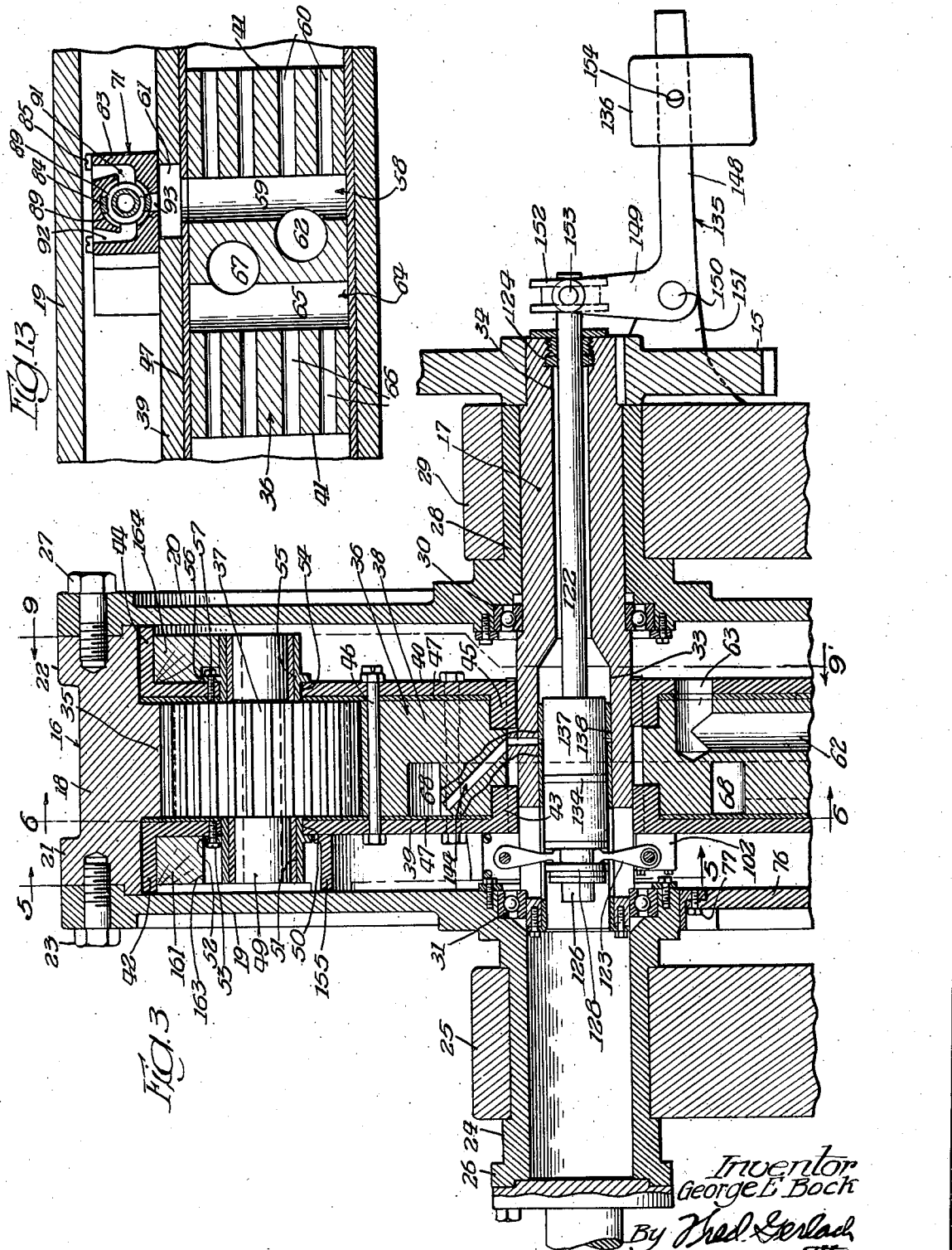

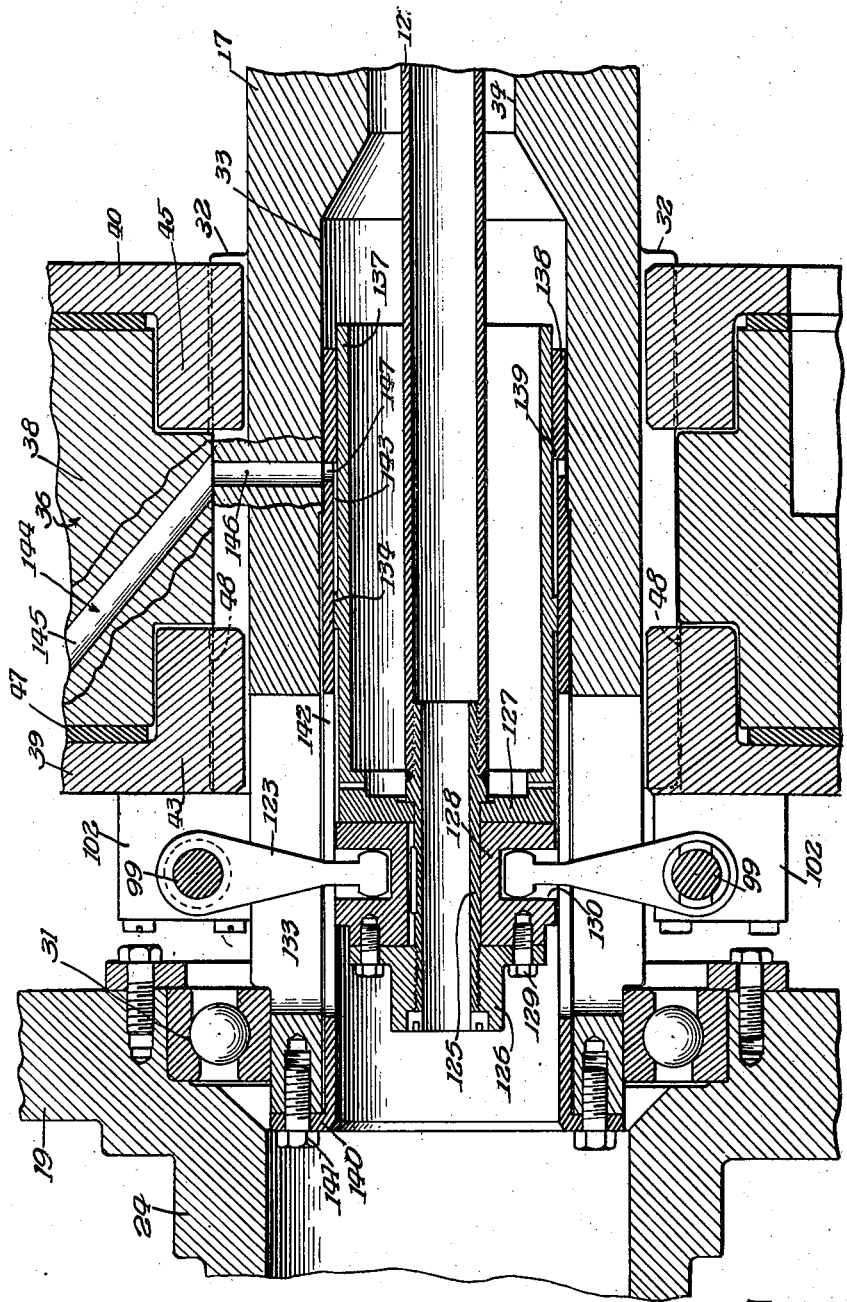

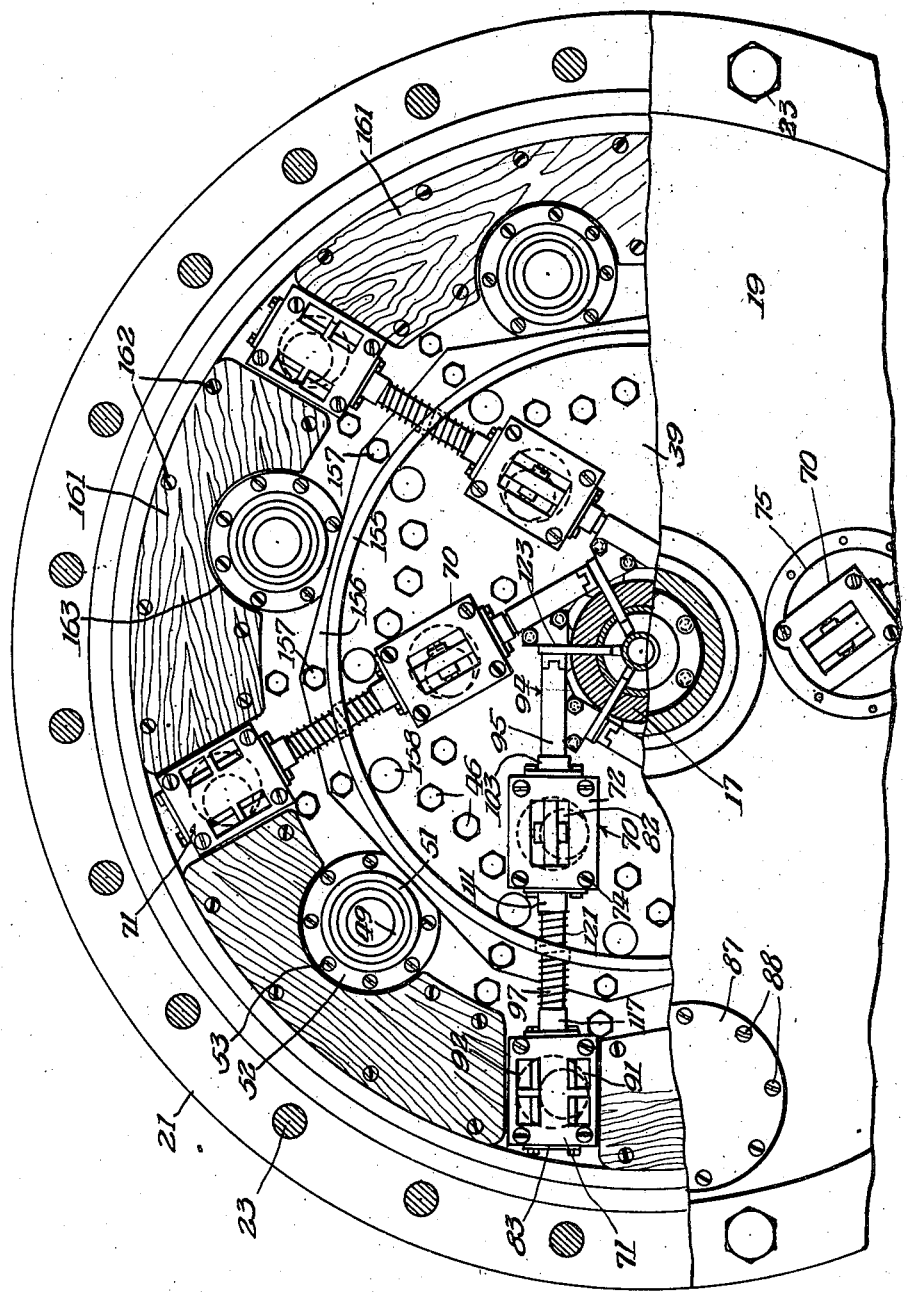

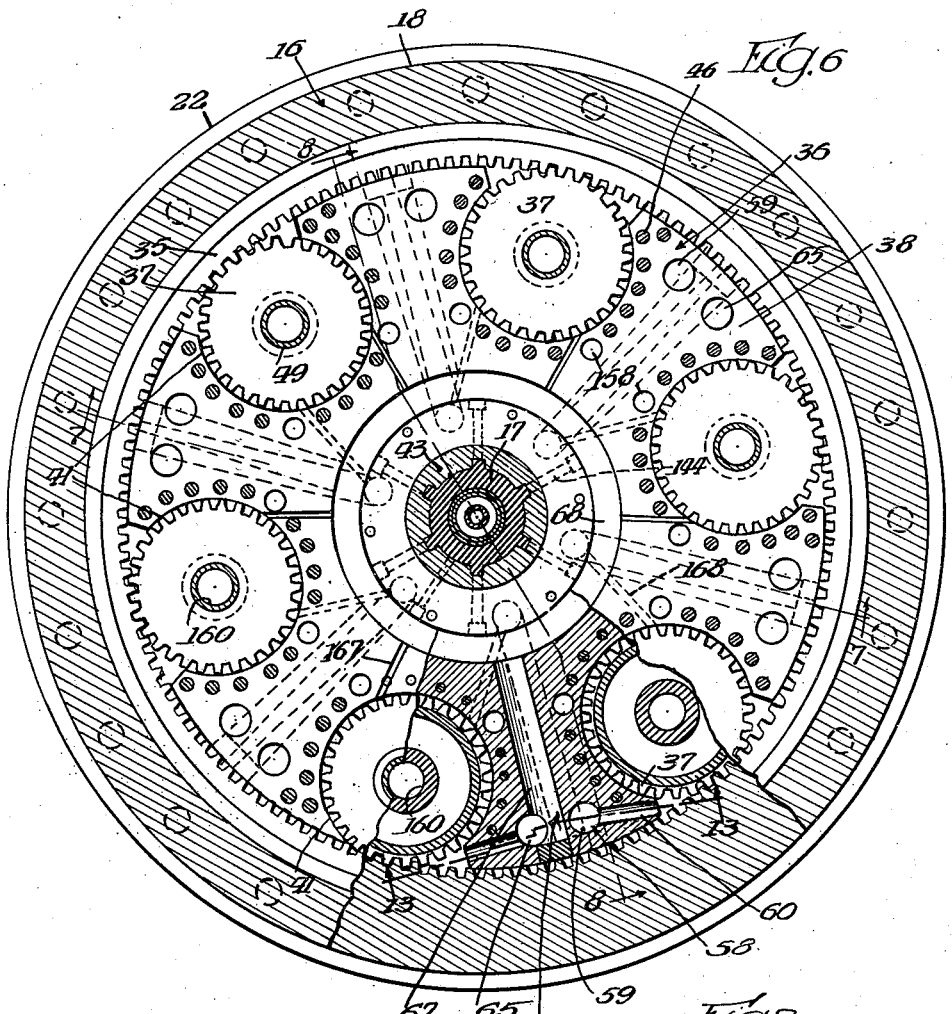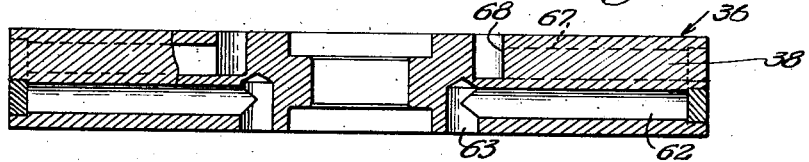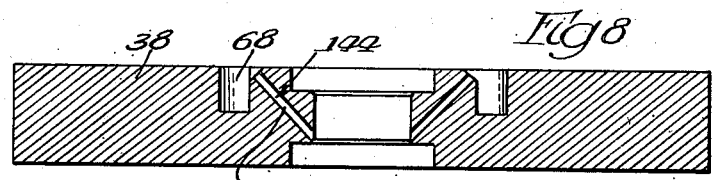

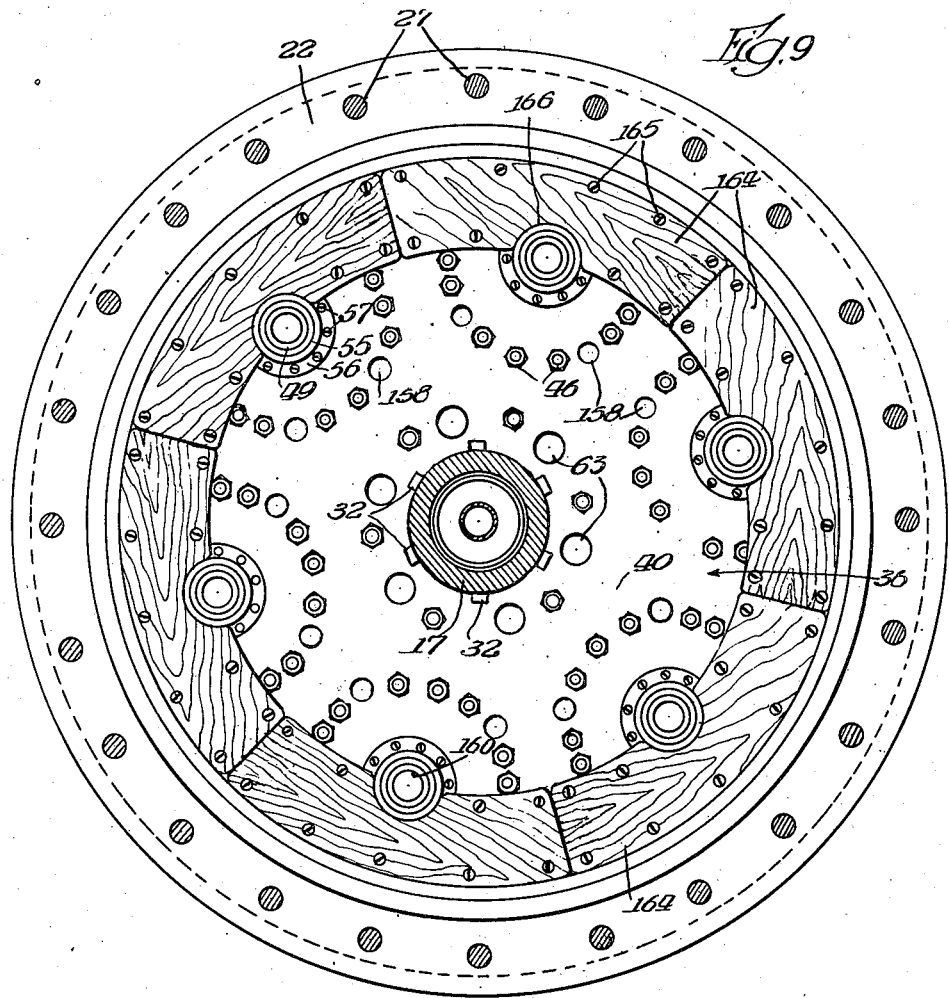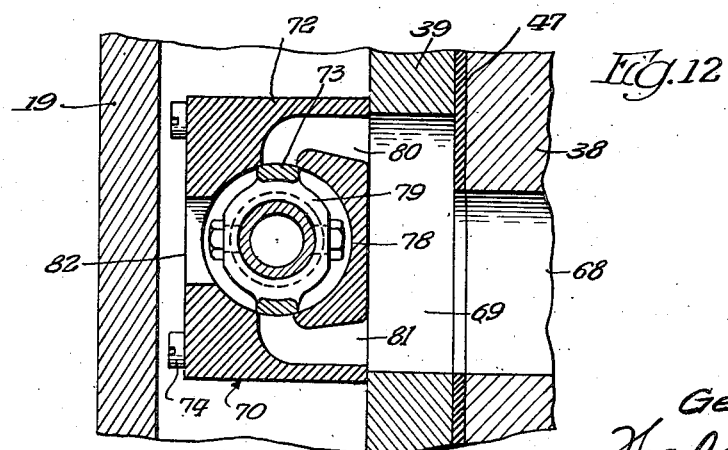

Oct. 23, 1945.  G. E. BOCK  2,387,230
VARIABLE SPEED HYDRAULIC COUPLING
Filed March 23, 1944  7 Sheets-Sheet 7
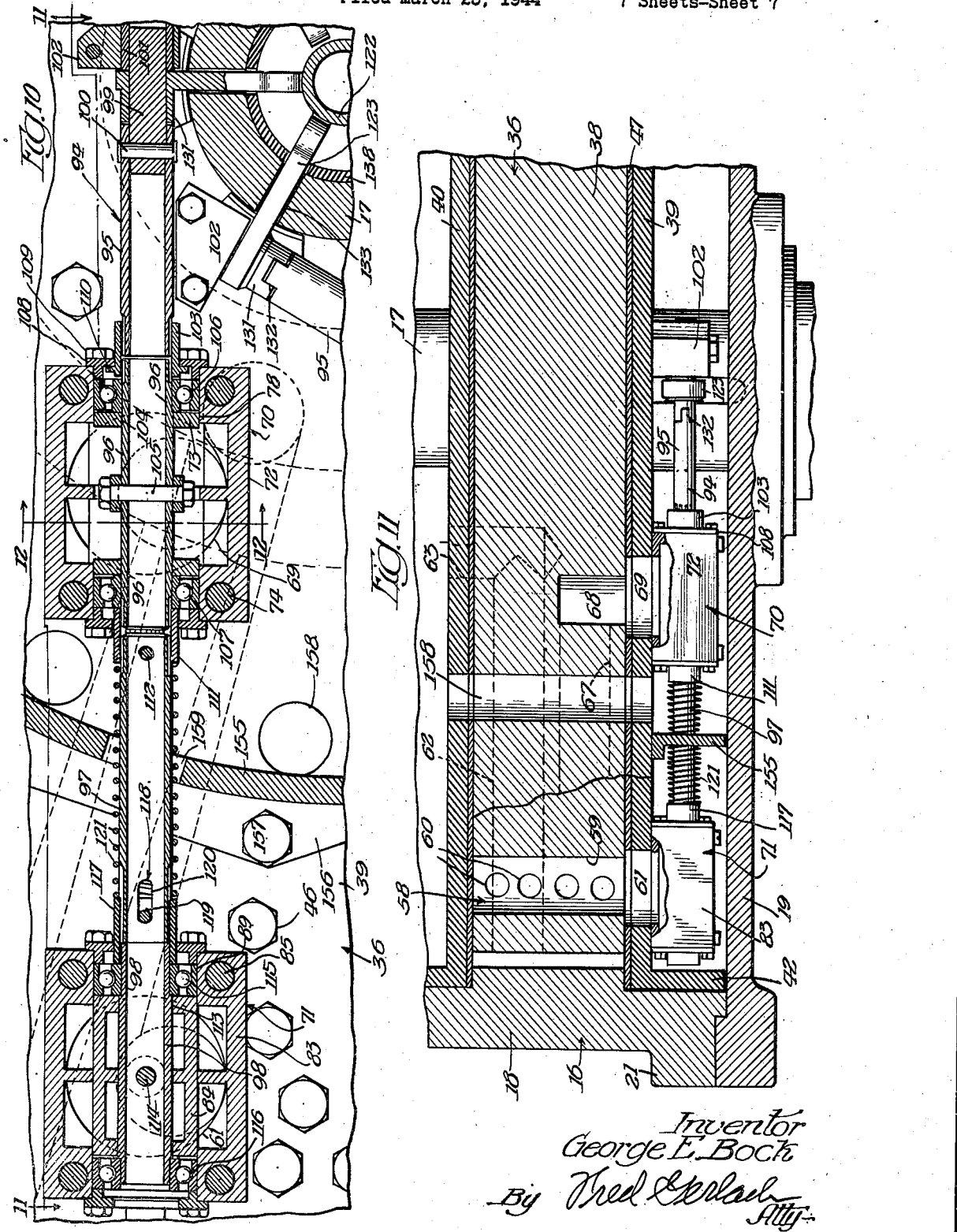

Patented Oct. 23, 1945

2,387,230

UNITED STATES PATENT OFFICE 2,387,230

VARIABLE-SPEED HYDRAULIC COUPLING

George E. Bock, Chicago, Ill., assignor to Whiting Corporation, Harvey, Ill., a corporation of Illinois Application March 23, 1944, Serial No. 527,770

27 Claims. (Cl. 192—61)

The present invention relates generally to variable speed hydraulic couplings. More particularly the invention relates to that type of hydraulic coupling which serves as a medium for driving a rotary member at different speeds (zero to maximum) from a constant speed prime mover and as its main or principal parts comprises: (1) a cylindrical rotatably mounted casing which is connected for drive by the prime mover, constitutes the driving element of the coupling, and has a partial filling of liquid, such as oil, which, in connection with drive of the casing, is flung outwards by centrifugal force and forms a ring shaped body around a central core of air; (2) a shaft which extends into the central portion of the casing, constitutes the driven element of the coupling and is connected to the rotary member; (3) a gear pump variety power transmission mechanism which serves operatively to connect the casing and shaft and embodies a ring gear extending around and in fixed relation with the inner periphery of the side wall of the casing, a casing surrounded carrier which is fixedly connected to the inner end of the shaft and has arcuate cavities in its outer margin facing and communicating with the ring gear, planetary pinions which are rotatably mounted in the cavities and have the outer portions thereof in mesh with the ring gear, means forming inlet ducts for supplying liquid from the ring shaped body to the suction sides of the pinions, and means forming outlet ducts leading from the pressure sides of the pinions to the casing interior; and (4) conjointly operable valves which are associated with, and serve to control the flow of fluid through, the outlet ducts.

When the outlet valves of a variable speed hydraulic coupling of this type are in their fully open position there is no drive of the shaft by the casing constituting the driving element. This is directly attributable to the fact that there is no restriction to the flow of liquid through the outlet ducts and as a result there is no resistance to rotation of the planetary pinions and the latter rotate freely in their respective cavities and impart no drive to the shaft through the medium of the carrier. When the outlet valves are in their fully closed position no circulation of fluid is permitted through the outlet ducts with the result that the pinions are locked against rotation relatively to the carrier and there is a direct and positive drive of the shaft by the casing. When the valves are in a partly open position wherein they permit of a limited flow of fluid through the outlet ducts the planetary pinions are permitted to revolve or rotate at a reduced speed with respect to the carrier and hence the shaft of the coupling is driven at a reduced or differential speed with respect to the casing. Adjustment of the outlet valves between their open and closed positions determines the speed of drive of the shaft by the casing.

One object of the invention is to provide a variable speed hydraulic coupling of this type which is an improvement upon, and has certain advantages over, previously designed hydraulic couplings and is characterized by exceptionally high efficiency and long life.

Another object of the invention is to provide a variable speed hydraulic coupling of the type under consideration in which the carrier of the gear pump variety power transmission mechanism between the casing and the shaft is spaced from the end walls of the casing so that the ring shaped body of liquid accumulates around the inner periphery of the cylindrical side wall of the casing, and the inlet ducts for supplying fluid to the suction sides of the planetary pinions have certain valve controlled branches which lead to, and communicate with, the outer portion of the casing interior so that they receive solid liquid from the ring shaped body when the valves therefor are open, and also have other uncontrolled or permanently open branches which lead to the central portion of the casing interior and serve when the inlet valves are closed and the outlet valves are open to supply air to the inlet ducts from the central core of air within the ring shaped body of liquid.

Another object of the invention is to provide a coupling of the last mentioned character in which the inlet valves for controlling said certain branches of the inlet ducts are mounted on the outer marginal portion of one of the end plates of the carrier and are accessible for removal or repair purposes by way of cover-plate closed openings in the adjacent end wall of the casing and the outlet valves for controlling the outlet ducts are mounted on the inner marginal portion of said one end plate of the carrier and are accessible for removal or repair purposes by way of cover-plate closed openings in said adjacent end wall of the casing.

Another object of the invention is to provide a variable speed hydraulic coupling of the type and character under consideration in which the inlet and outlet valves are of the rotatable plug variety and are so designed and constructed that they are interchangeable and are conjointly controlled by means of rotatable bearing supported shafts which extend substantially radially with respect to the driven shaft and have the plugs of the valves so mounted thereon that the plugs of the inlet valves are in their closed position when the plugs of the outlet valves are in their open position.

Another object of the invention is to provide a coupling in which the liquid is caused to circulate from the valve equipped side of the carrier to the other carrier side and then back to the valve equipped carrier side for cooling and pressure equalizing purposes by way of cross bores in the carrier and directly outwards of the outlet valves and longitudinally extending centrally disposed bores in the stub shafts that serve rotatably to support the planetary pinions.

Another object of the invention is to provide a variable speed hydraulic coupling of the last mentioned character in which the inlet ends of the air branches of the inlet ducts extend through the carrier end plate that is opposite the valve equipped end plate so that they do not directly receive the liquid component of the discharge from the discharge valves, and the valve equipped end wall of the carrier is provided with an annular or ring shaped baffle which is disposed between the inlet and outlet valves and serves to direct the fluid discharged by the outlet valves into the cross bores in the carrier.

A further object of the invention is to provide in connection with a variable speed hydraulic coupling of the type under consideration (1) means for balancing the various pressures in the pinion cavities of the carrier in order to reduce the load on the bearings for the pinion carrying shafts; (2) simple and novel means for conjointly rotating the valve actuating or control shafts; (3) novel means for automatically controlling the valves in order to maintain a substantially constant torque of the driven shaft; and (4) fairing blocks which are mounted on the outer margins of the end plates of the carrier and serve to give the inlet valves and the bearings for the pinion carrying shafts such a smooth outline or contour that drag or resistance is minimized and also serve so to reduce the thickness of the spaces between the outer margin of the carrier and the outer marginal portions of the end walls of the casing that the liquid is effectively cooled as it circulates from one side of the carrier to the other.

A still further object of the invention is to provide a variable speed hydraulic coupling which is generally of new and improved construction and not only effectively and efficiently fulfills its intended purpose but also is in the form of a self-contained unit.

Other objects of the invention and the various advantages and characteristics of the present variable speed hydraulic coupling will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is an end view of a variable speed hydraulic coupling embodying the invention, certain parts being omitted and another part being shown in section in order to show the design of the casing end wall having the cover-plate closed openings for permitting access to, and removal of, the inlet and outlet valves;

Figure 2 is a plan view of the coupling, the bearings for supporting the casing being omitted;

Figure 3 is a fragmentary vertical longitudinal section of the coupling showing in detail the construction and arrangement of the gear pump variety power transmission mechanism which serves operatively to connect the casing and the shaft constituting the driven element of the coupling;

Figure 4 is an enlarged vertical longitudinal section of the central portion of the coupling illustrating in detail the construction and arrangement of certain parts of the means for automatically controlling the valves in order to maintain a substantially constant torque so far as the driven shaft is concerned;

Figure 5 is a vertical transverse section taken on the line 5—5 of Figure 3 and showing the arrangement and manner of mounting of the inlet and outlet valves;

Figure 6 is a reduced vertical transverse section taken on the line 6—6 of Figure 3 and illustrating in detail the design of the body part of the pinion carrier of the gear pump variety power transmission mechanism;

Figures 7 and 8 are sections taken respectively on the lines 7—7 and 8—8 of Figure 6 and illustrating the cross sectional construction of the body part of the pinion carrier;

Figure 9 is a reduced vertical transverse section taken on the line 9—9 of Figure 3;

Figure 10 is an enlarged detailed section of one of the inlet valves and the associated outlet valve;

Figure 11 is a section on the line 11—11 of Figure 10;

Figure 12 is a section taken on the line 12—12 of Figure 10 and illustrating in detail the construction and design of one of the outlet valves; and Figure 13 is an enlarged section on the line 13—13 of Figure 6.

The variable speed hydraulic coupling which is shown in the drawings constitutes the preferred form or embodiment of the invention. It serves as a medium for driving a rotary member 15, such as a gear, at different speeds from a prime mover (not shown) and as its primary or principal parts comprises a cylindrical rotary casing 16, a main driven shaft 17, a gear pump variety power transmission mechanism for operatively connecting the casing and shaft, a valve arrangement for controlling the mechanism, and means for automatically controlling the valve arrangement in order to maintain a substantially constant torque so far as the shaft 17 is concerned.

*Casing*

The cylindrical rotary casing 16 constitutes the driving element of the coupling and preferably is arranged to revolve or rotate about a horizontal axis. It surrounds the gear pump variety power transmission mechanism and consists of a ring shaped or cylindrical side wall 18 and a pair of circular or disc-like end walls 19 and 20. The side wall is provided at one end thereof with an annular outwardly extending flange 21 and at its other end with an outwardly extending flange 22. The outer margin of the end wall 19 fits against the flange 21 of the side wall 18 and is removably secured thereto by bolts 23. The central portion of the end wall 19 is provided with an outwardly extending tubular hub 24 and this is journalled in a bearing 25 and has at its outer end an annular outwardly extending flange 26. The latter, as shown in Figure 3, is adapted to be connected to the driven part of the prime mover. The prime mover may be a constant speed electric motor or an internal combustion engine that is adapted to be driven at a constant speed. The outer margin of the end wall 20 of the casing 16 fits against the annular flange 22 and is secured thereto by way of an annular series of bolts 27. The central portion of the end wall 20 is provided with an integral outwardly extending tubular hub 28 and this, as shown in Figure 3, is the same in size as, and in coaxial relation with, the hub 24 of the end wall 19 and is journalled in a bearing 29. The casing 16 has a partial filling of liquid, such as oil. When the casing is driven in connection with operation of the prime mover the liquid is flung outwards by centrifugal force and forms a ring shaped body or annulus in the outer portion of the casing. The body of liquid surrounds a central core of air in the central portion of the casing.

Driven shaft

The shaft 17 constitutes the driven element of the coupling and extends through, and is rotatable relatively to, the tubular hub 28 of the casing end wall 20. The outer end of the shaft is of reduced diameter and carries the rotary member 15, as shown in Figure 3. The member is keyed or otherwise fixedly secured to the outer end of the shaft 17 so that it is drivably connected to the shaft. The inner end of the shaft extends across the central portion of the casing interior and is rotatably supported by way of a pair of roller bearings 30 and 31. The outer race of the roller bearing 30 is confined within an annular groove in the inner end of the hub 28 of the casing end wall 20 and the inner race abuts against an annular shoulder on the adjacent portion of the shaft 17. The roller bearing 31 is the same in size as, and in axial relation with, the bearing 30 and has its outer race confined in an annular groove in the inner end of the hub 24 of the casing end wall 19. The inner race of the bearing 31 surrounds the inner extremity of the shaft 17 and abuts against an annular shoulder on the shaft. The portion of the shaft 17 which is disposed in the casing is provided with an annular series of laterally spaced longitudinal splines 32 and has a large sized centrally disposed longitudinally extending bore 33. The other portion of the driven shaft 17, i. e., the portion that is rotatably mounted in the hub 28, has a small sized centrally disposed longitudinally extending bore 34. The inner or adjacent ends of the two bores communicate with one another, as shown in Figure 3. The other or outer end of the bore 33 is open so that the bore communicates with the interior of the tubular hub 24.

Gear pump variety power transmission mechanism

The gear pump variety power transmission mechanism which serves operatively to connect the casing 16 to the driven shaft 17 is under control of the aforementioned valve arrangement and embodies a ring gear 35 with internal teeth, a rotary carrier 36 and a plurality of planetary pinions 37. The ring gear 35 is formed as an integral part of the central portion of the cylindrical side wall 18 of the casing 16 and hence is driven in connection with drive of the casing by the prime mover. The rotary carrier 36 is disposed in the casing 16 midway between the casing end walls 19 and 20 and surrounds, and is fixedly connected to, the inner portion of the driven shaft 17. It is composite in character and consists of an intermediate ring shaped body part 38 and a pair of annular end plates 39 and 40. The body part 38 is surrounded by the ring gear 35 and embodies on the outer portion thereof a plurality of equidistantly spaced arcuate cavities 41. The latter correspond in number to the planetary pinions 37 and face in the direction of, and open onto, the ring gear. As illustrated in Figure 3, the cavities 41 extend to and through the end faces of the body part 38. The end plate 39 of the carrier 36 is disposed in opposed relation with, but spaced inwardly from, the end wall 19 of the casing and is provided at the outer margin thereof with an integral outwardly extending flange 42 and at its inner margin with an inwardly extending annular flange 43. The outwardly extending annular flange 42 fits rotatably in a groove in the end wall of the casing side wall having the flange 21 and the inwardly extending annular flange 43 fits in an annular groove in the inner margin of the body part 38. The end plate 40 of the carrier is disposed inwards of the casing end wall 20 and is provided at its outer margin with an outwardly extending annular flange 44 and at its inner margin with an inwardly extending annular flange 45. The outwardly extending flange 44 fits rotatably in an annular groove in the end of the casing side wall 18 that has the outwardly extending annular flange 22. The other flange of the end plate 40, i. e., the inwardly extending flange 45, fits within an annular groove in the inner margin of the carrier body part 38. Through bolts 46 extend through aligned holes in the body part and end plates of the carrier and serve to hold the end plates in connected or rigid relation with the body part. The outer marginal portions of the end plates of the carrier serves as closures for the ends of the arcuate cavities 41. Thin ring shaped plates 47 of wear resisting material are interposed and clamped between the end faces of the carrier body part 38 and the inner faces of the end plates 39 and 40 and serve as thust bearings for the planetary pinions 37. The inwardly extending flanges 43 and 45 on the inner margin of the side plates of the carrier have splineways 48 for the splines 32 on the inner portion of the driven shaft 17. The splines serve drivably to connect the carrier to the shaft 17. The planetary pinions 37 are mounted for the most part in the cavities 41 and have the outer portions thereof in mesh with the ring gear 35. They are rotatably supported by way of stub shafts 49 which extend through the central portions of the pinions and have the ends thereof projecting therebeyond. The ends of the stub shafts 49 that project in the direction of the casing end wall 19, extend through holes 50 in the carrier end plate 39, and are journalled in cylindrical bearings 51 which are provided with outwardly extending annular flanges 52 and have the inner ends thereof seated in the portions of the end plate 39 that define the holes 50. The flanges 52 of the bearings fit against the adjacent portions of the carrier end plate 39 and are secured thereto by cap screws 53. The other ends of the stub shafts 49, i. e., the ends that are disposed adjacent the casing end wall 20, extend through holes 54 in the carrier end plate 40 and are journalled in cylindrical bearings 55. The latter are provided with substantially centrally disposed outwardly extending flanges 56 and have the inner ends thereof seated in the portions of the end plate 40 that define the holes 54. The flanges 56 abut against the adjacent portions of the carrier end plate 40 and are removably secured thereto by way of cap screws 57.

The carrier 36 of the gear pump variety transmission mechanism is adapted, as hereinafter described, to be driven by the casing 16 constituting the driving element of the coupling and when driven by the casing rotates in the same direction as the casing. For purposes of the present disclosure it will be assumed that the casing 16 of the coupling is driven in a clockwise direction as viewed in Figures 1, 5 and 6. The leading portions of the arcuate recesses 41 in the outer portion of the body part 38 of the carrier 36 are connected to receive fluid from the interior of the casing 16 by way of inlet ducts 58. These ducts comprise cross bores 59, ports 60, holes 61 and passages 62. The cross bores 59 are formed in the outer marginal portion of the body part 38 of the carrier 36 and are positioned directly ahead of the leading portions of the arcuate cavities 41. The ends of the cross bores 59 that project in the direction of the casing end wall 20 are closed by the carrier end plate 40. The ports 60 are formed in the outer marginal portion of the carrier body part 38 and establish communication between the cross bores 59 and the leading portions of the arcuate cavities 41. As shown in Figure 13, each cross bore 59 is connected to the leading portion of its arcuate cavity by way of a plurality of ports 60. The holes 61 are formed in the outer marginal portion of the carrier end plate 39 and are in registry with the ends of the cross bores 59 that project in the direction of the casing end wall 19. They are preferably of greater diameter than the bores 59 and constitute liquid receiving branches of the inlet ducts 58. Such branches lead to, and communicate with, the outer portion of the casing interior so that they receive solid liquid from the ring shaped body that forms around the inner periphery of the side wall of the casing during drive of the casing by the prime mover. As hereinafter described, the holes 61 constituting the liquid receiving branches of the inlet ducts 58 are controlled by the valve arrangement. The passages 62 are formed in, and extend radially with respect to, the body part 38 of the carrier. The outer ends of the passages intersect and communicate with the cross bores 59. The inner ends of the passages 62 extend laterally in the direction of the casing end wall 20 and communicate with the central portion of the casing interior by way of holes 63 in the inner marginal portion of the end plate 40 of the carrier. The passages 62 and the holes 63 constitute air receiving branches of the inlet ducts and these branches lead from the central portion of the casing interior and serve to deliver or supply air to the cross bores 59 from the air core that is formed in the central portion of the casing during drive of the casing 16. The air branches of the inlet ducts are always open. The trailing portions of the arcuate cavities 41 communicate with the central portion of the casing interior by way of outlet ducts 64. The latter consist of cross bores 65, ports 66, passages 67, an annular groove 68 and holes 69. The cross bores 65 are formed in the outer marginal portion of the body part 38 of the carrier and are located directly behind the trailing portions of the cavities 41 and in front of the cross bores 59. The ends of the cross bores 65 are closed by the end plates of the carrier. The ports 66 are formed in the outer marginal portion of the body part of the carrier and extend between, and communicate with, the cross bores 65 and the trailing portions of the arcuate cavities 41. As shown in Figure 13, each cross bore 65 is provided with a plurality of ports 66. The passages 67 are formed in, and extend radially with respect to, the carrier body part 38 and are offset with respect to the passages 62 of the inlet ducts 58. The outer ends of the passages 67 intersect and communicate with the bores 64. The inner ends of the passages 67 intersect and communicate with the annular groove 68 and this is formed in the end face of the carrier body part 38 that faces the casing end wall 19 and is closed by the carrier end plate 39. The holes 69 correspond in number to the cross bores 65 and are formed in the inner marginal portion of the carrier end plate 39. They are arranged in an annular series and register and communicate with the groove 68. The outlet ducts 64 are controlled, as hereinafter described, by the valve arrangement. When the casing 16 constituting the driving element of the coupling is driven by the prime mover while there is no restriction of the outlet ducts 64 the ring gear 35 serves to drive or rotate the planetary pinions 37 relatively to the carrier 36. The pinions during drive thereof serve as pumping means and cause fluid to flow from the casing interior through the inlet ducts 58 and thence back to the casing interior by way of the outlet ducts 64. The pumping action is attributable to the fact that the teeth of the planetary pinions create suction as they emerge from engagement with the teeth of the ring gear 35 and such suction results in the flow of fluid to the leading or suction sides of the cavities 41 via the inlet ducts 59. The fluid that is drawn into the leading portions of the cavities flows into the spaces between the teeth of the planetary pinions and thence revolves around the cavities until the teeth of the pinions again enter into engagement with the teeth of the ring gear. When the teeth of the pinions again enter into engagement with the teeth of the ring gear the fluid which is carried between the spaces of the pinion teeth is forced back to the casing interior via the outlet ducts 64. When the outlet ducts are fully open or unrestricted there is a free pumping of the fluid by the planetary pinions with the result that such pinions revolve or rotate without resistance and the carrier 36 and the driven shaft 17 remain stationary. When, however, the outlet ducts 64 are closed by the valve arrangement, as hereinafter described, pressure builds up on the pressure sides of the planetary pinions and results in the pinions being locked or held against rotation relatively to the carrier. In the event that the pinions are locked against rotation relatively to the carrier as the result of closing of the outlet ducts the carrier is positively driven by the ring gear and hence there is a conjoint and positive drive of the shaft 17 by the casing 16. When the outlet ducts 64 are partially open wherein they permit of a limited flow of fluid therethrough the planetary pinions 37 are permitted to turn or rotate at a reduced speed relatively to the carrier and hence the shaft 17 of the coupling is driven at a reduced or differential speed with respect to the constantly driven casing 16.

Valve arrangement

The valve arrangement serves to control the outlet ducts 64 and also the liquid receiving branches (holes 61) of the inlet ducts 59 and comprises outlet valves 70 and inlet valves 71. The outlet valves 70 correspond in number to, and are associated respectively with, the holes 69 constituting the discharge ends of the outlet ducts 64. They are mounted on the outer face of the carrier end plate 39 and consist of cast metal housings 72 and rotatable plugs 73. The housings 72 are block-like so far as shape or contour is concerned and are removably secured in place by means of bolts 74. The bolts extend through the corner portions of the housings and have the inner ends thereof disposed in internally threaded holes in the carrier end plate 39. As shown in Figure 1, the inner marginal portion of the end wall 19 of the casing is provided with a pair of diametrically opposite circular openings 75. These openings are normally closed by cover plates 76. An annular series of screws 77 extend through the marginal portions of the cover plates 76 and into the portions of the carrier end wall 19 that define the openings 75 and serve removably to secure the cover plates in place. When the cover plates are removed the openings 75 provide access to the outlet valves 70 and the latter, upon removal of the bolts 74, may be withdrawn for inspection, repair or replacement purposes through the openings 75. The outlet valves are successively brought into registration with the openings 75 by rotating the casing 16 relatively to the carrier 36. The outlet valves are arranged in an annular series as shown in Figure 5. The housings 72 of the outlet valves are provided with bores 78 and these are open ended. As illustrated in Figure 11, the housings 72 are so arranged that the axes of the bores extend tangentially with respect to the driven shaft 17. The plugs 73 of the outlet valves are rotatably mounted in the bores 78 and have centrally disposed cross ports 79. Each of the housings 72 of the outlet valves is provided with a pair of inlet ports 80 and 81 and an outlet port 82. The receiving ends of the inlet ports extend through the inner faces of the housings 72 and communicate with the holes 69 in the inner marginal portion of the end plate 39 of the carrier. The other or discharge ends of the inlet ports 80 and 81 lead to, and communicate with, the bores 78. As shown in Figure 12, the discharge ends of the inlet ports 80 are disposed diametrically opposite the discharge ends of the inlet ports 81. The outlet ports 82 extend through the outer faces of the housings 72 of the outlet valves and lead to, and communicate with, the bores 78. They are disposed at right angles to the discharge ends of the inlet ports 80 and 81. When the plugs 73 are turned so that the cross ports 79 thereof are out of registry with the discharge ends of the inlet ports 80 and 81 the outlet ducts 64 leading from the trailing portions of the arcuate cavities 41 and consisting of the cross bores 65, ports 66, the passages 67, the annular groove 68 and the holes 69, are closed against flow of fluid therethrough with the result that a direct driving connection is established between the carrier 36 and the ring gear 35 and the shaft 17, in connection with drive of the coupling, is driven conjointly with, i. e., at the same speed as, the casing 16 constituting the driving element of the coupling. When the plugs 73 of the outlet valves are positioned so that the cross ports 79 thereof are in registry with the discharge ends of the inlet ports 80 and 81 the outlet valves are in their fully open position and there is no restriction to the flow of fluid through the outlet ducts with the result that the carrier and the drive shaft remain stationary while the casing revolves. When the plugs 73 are turned or rotated so that the cross ports 79 thereof are partially in registry with the discharge ends of the inlet ports 80 and 81 flow of fluid through the outlet ducts is restricted with the result that the back pressure against the pressure sides of the planetary pinions creates such resistance that the pinions rotate at a reduced speed with respct to the carrier and the carrier and driven shaft are driven at a reduced speed by the casing. From the foregoing it is manifest that adjustment of the plugs of the outlet valves determines the speed of drive of the shaft 17 by the constantly driven casing 16 constituting the driving element of the coupling.

The inlet valves 71 correspond in number to the outlet valves 70 and are associated respectively with the holes 61 constituting the liquid receiving branches of the inlet ducts 59. They are the same in design as, but are reversely positioned with respect to, the outlet valves 70. Because the outlet and inlet valves are the same in design and construction they are interchangeable. As shown in Figure 13 the inlet valves 71 consist of block-like housings 83 and rotatable plugs 84. The housings 83 are located outwards of, and are aligned respectively with, the outlet valves 70 and fit against the outer marginal portion of the carrier end plate 39. Bolts 85 extend through the corner portions of the housings 83 and into internally threaded sockets in the carrier end plate 39 and serve removably to secure in place the inlet valves 71. As shown in Figure 1 of the drawings, the outer marginal portion of the end wall 19 of the casing 16 is provided with a pair of diametrically opposite openings 86. These openings are normally closed by cover plates 87 which are removably secured in place by screws 88. The latter extend through the marginal portions of the cover plates and into the casing end wall 19. When the cover plates 86 are removed the inlet valves 71 are accessible for inspection or repair purposes and may, upon removal of the bolts 85, be withdrawn from the casing via the openings 86. The inlet valves are successively brought into registry with the openings 86 by rotating the casing 16 relatively to the carrier. The openings 86 are preferably located 90° from the cover-plate closed openings 75. The housings 83 of the inlet valves are provided with bores 89 and these are open ended and have the axes thereof aligned with the axes of the bores 78 of the housings of the outlet valves 70. The plugs 84 of the inlet valves are rotatably mounted in the bores 89 and have cross ports 90 formed therein. Each of the housings 83 is provided with a pair of inlet ports 91 and 92 and an outlet port 83. The receiving ends of the inlet ports extend through the outer faces of the housings 83 and the other or discharge ends intersect the bores 89. As shown in Figure 13, the discharge ends of the inlet ports 91 are positioned diametrically opposite the inlet ends of the inlet ports 92. The outlet ports 93 lead from the bores 89 to and through the inner faces of the valve housings 83. They are positioned at right angles to the discharge ends of the inlet ports 91 and 92 and register and communicate with the holes 61 constituting the liquid receiving branches of the inlet ducts 58 leading to the leading portions of the arcuate cavities 71 for the planetary pinions 37. The casing 16 is charged with sufficient liquid so that the inlet valves 83 are fully immersed in the liquid when the latter assumes the form of a ring shaped body within the side wall 18 of the casing. As hereinafter described, the plugs 84 of the inlet valves are connected to the plugs of the outlet valves so that they are conjointly rotatable therewith. They are, however, arranged so that they are in their closed position when the plugs of the outlet valves are in their open position. When the plugs of the inlet valves are in their closed position as the result of the plugs of the outlet valves being in their open position the liquid receiving branches of the inlet ducts are closed and the planetary pinions pump only air which is received via the air branches of the inlet ducts, i. e., the passages 62 and the holes 63. By closing the liquid receiving branches of the inlet ducts when the outlet valves are in their fully open position the fluid that is pumped by the planetary pinions is of minimum density in that it is air alone and hence there is no likelihood of the carrier 36 being rotated by the casing 16 of the coupling. When the inlet valves are in their open position and the outlet valves are in their closed position the planetary pinions pump solid liquid as the result of the fact that the liquid in the ring shaped body within the side wall of the casing is heavier than the air in the air core in the central portion of the casing and hence feeds into the leading portions of the cavities 41. Likewise, when the inlet valves 71 are in a partially open position while the outlet valves 70 are also in a partially open position the pumpage resulting from rotation of the planetary pinions is solid liquid. By having the inlet valves positioned so that they are directly inwards of the side wall of the casing the liquid drawn therethrough while the inlet valves are open is of maximum density and hence free from foam or trapped air. By having the holes 63 constituting the receiving ends of the air branches of the inlet ducts disposed adjacent the central portion of the casing interior and on the side of the carrier that is opposite the side on which the outlet valves are mounted there is little, if any, likelihood of liquid being drawn into the inlet ducts while the inlet valves for the liquid receiving branches of the inlet ducts are closed.

The outlet valves 70 and the inlet valves 71 are conjointly controlled by way of sectional rock shafts 94. The latter correspond in number to, and are associated respectively with, the pairs of valves. They extend tangentially of the inner portion of the driven shaft 17 and are located between the end plate 39 of the carrier 36 and the end wall 19 of the casing 16. As shown in Figure 10, the rock shafts are hollow and each consists of an inner section 95, a pair of intermediate sections 96 and 97 and an outer section 98. The inner ends of the inner sections of the rock shafts are provided with longitudinally extending pintles 99. The outer ends of these pintles extend into the inner ends of the inner sections of the rock shafts and are fixedly secured thereto by way of cross pins 100. The latter extend through aligned holes in the outer ends of the pintles and the inner ends of the inner sections of the rock shafts and have rivet-like heads at the ends thereof. The inner ends of the pintles are journalled in bearings 101. Such bearings, as shown in Figure 10, are carried by pillow blocks 102, which are bolted to the inner marginal portion of the carrier end plate 39. The outer ends of the inner sections 95 of the rock shafts terminate adjacent the inner end faces of the housing 72 of the outlet valve 70 and are connected to the inner ends of the intermediate rock shaft sections 96 by way of collars 103. The central portions of the shaft sections 96 extend through longitudinal bores 104 in the plugs 73 of the outlet valves and are connected to said plugs by way of transversely extending bolts 105. The inner ends of the shaft sections 96 are supported by ball bearings 106 and the outer ends of the shaft sections 96 are supported by ball bearings 107. The inner races of the ball bearings 106 extend around and are secured to the inner ends of the shaft sections 96 and the outer races fit within the inner ends of the bores 78 in the housings 72 of the outlet valves and are secured against inward axial displacement by way of rings 108. The latter are T-shaped in cross section and are secured to the housings 72 of the outlet valves by bolts 109. The inner races of the ball bearings 107 extend around, and are secured to, the outer ends of the shaft sections 96 and the outer races fit within the outer ends of the bores 78 and are suitably secured against axial movement relatively to the housings 72 of the outlet valves. The collars 103 have internal longitudinally extending splines, the inner ends of which fit within external splineways in the outer ends of the rock shaft sections 95 and the outer ends of which fit within external longitudinally extending splineways in the inner ends of the shaft sections 96. The outer ends of the collars 103 are provided with outwardly extending flanges 110 and these are arranged in interlocked relation with the rings 108 and serve to connect the collars 103 to the housings 72 of the outlet valves. The collars serve to connect the shaft sections 95 and 96 for conjoint turning and permit the shaft sections 96 to be disconnected from the inner shaft sections 95 in connection with removal of the outlet valves via the openings 75. When it is desired to remove the outlet valves the cover plates 76 are first removed. Thereafter the bolts 74 are removed and the outlet valves are shifted outwards in order to disengage the inner ends of the collars 103 from the outer ends of the inner sections 95 of the rock shafts. After outward shift the outlet valves are free and hence may be removed from the casing interior via the openings 75.

The intermediate sections 97 of the rock shafts are axially aligned with, and are disposed directly outwards of, the shaft sections 96. The inner ends of the shaft sections 97 are connected to the outer ends of the shaft sections 96 by way of collars 111. Such collars are provided with longitudinally extending internal splines, the inner ends of which fit within external longitudinally extending splineways in the outer ends of the shaft sections 96 and the outer ends of which fit within external longitudinally extending splineways in the inner ends of the shaft sections 97. The outer ends of the collars 111 are fixedly connected to the inner ends of the shaft sections 97 by way of cross pins 112. The collars 111 serve normally to connect the shaft sections 96 and 97 for conjoint turning or rotation and permit the sections 97 to be removed from the sections 96 in connection with removal of the outlet valves 70.

The outer sections 98 of the rock shafts 94 are axially aligned with, and are disposed directly outwards of, the intermediate shaft sections 97 and are disposed in the housings 83 of the inlet valves 71. The central portions of the shaft sections 98 extend through longitudinal bores 113 in the plugs 84 of the inlet valves and are connected to said plugs by way of transversely extending bolts 114. The inner ends of the shaft sections 98 are supported by ball bearings 115 and the outer ends of said shaft sections 98 are supported by way of ball bearings 116. The inner races of the ball bearings 115 surround and are rigidly secured to the inner ends of the shaft sections 98 and the outer races fit within the inner ends of the bores 89 in the housings 83 of the inlet valves and are suitably secured against axial displacement. The inner races of the ball bearings 116 surround and are rigidly secured to the outer ends of the outer shaft sections 98 and the outer races fit and are secured within the outer ends of the bores 89. Collars 117 serve to connect the shaft sections 97 and 98 for conjoint turning or rotation. These collars have longitudinally extending internal splines, the inner ends of which fit within external longitudinally extending splineways in the outer ends of the shaft sections 97 and the outer ends of which fit within external longitudinally extending splineways in the inner ends of the shaft sections 98. The collars 117 are connected to the outer ends of the shaft sections 97 for limited sliding movement by way of pin and notch connections 118. These connections consist of pins 119 and slots 120. The slots are formed in the outer ends of the shaft sections 97 and extend longitudinally of said sections. The pins 119 extend through the slots and have the ends thereof connected to the inner ends of the collars 117. When it is desired to remove the inlet valves 71 the collars 117 are shifted inwards so as to disengage the outer ends thereof from the inner ends of the outer shaft sections 98. After inward shift of the collars the inlet valves may be removed by withdrawing the bolts 85. As soon as the bolts are withdrawn the inlet valve may be removed from the casing interior via the openings 86. Compression springs 121 surround the intermediate shaft sections 97 and serve to urge the collars 117 outwards. The inner ends of the springs abut against the outer ends of the collars 111 and the outer ends of the springs abut against the inner ends of the collars 117. By reason of the fact that the rock shafts 94 are sectional removal of the outlet and inlet valves may be readily effected.

The plugs 84 of the inlet valves are mounted on the outer sections 98 of the rock shafts so that they are in their fully closed position when the plugs 73 of the outlet valves 70 are in their fully open position. The rock shafts 94 are rocked or turned for valve shifting purposes by means of a horizontally extending rod 122 and an annular series of arms 123. The rod 122 extends through the bores 33 and 34 in the driven shaft 17 and is longitudinally slidable. The outer end of the rod projects beyond the outer end of the shaft 17, as shown in Figure 3. A sealing ring 124 is connected to the outer end of the shaft 17 and permits longitudinal sliding movement of the rod 122 while at the same time preventing leakage of fluid from the casing interior via the bore 34. The inner end of the rod 122 is provided with a longitudinally extending stem 125 and this is of reduced diameter and has a nut 126 at its free end. A ring shaped plate 127 and a sleeve 128 surround the stem 125 and are clamped against the inner end of the rod 122 by the nut 126. The plate 127 abuts against the inner end of the rod 122 and the sleeve 128 is interposed between the plate 127 and the nut. As shown in Figure 4, the sleeve 128 is keyed to the stem 125 and is locked to the nut 126 by bolts 129 which extend through an annular flange on the inner end of the nut. An annular groove 130 is formed in the outer peripheral portion of the sleeve 128. The arms 123 correspond in number to, and are associated respectively with, the rock shafts 94. They extend radially from the sleeve 128 and have sleeve-like parts 131 at their outer ends. The latter surround the pintles 99 and have their inner ends in abutment with the bearings 101. The outer ends of the sleeve-like parts 131 of the arms 123 are connected to the inner ends of the inner sections 95 of the rock shafts by tooth and notch connections 132 (see Figure 10). The latter serve to connect the arms 122 to the rock shafts in such manner that the rock shafts are caused to rock in response to swinging movement of the arms. The inner ends of the arms extend through longitudinal slots 133 in the inner end of the driven shaft 17 and project into the annular groove 130 in the sleeve 128. When the rod 122 is slid inwards the arms 123 are caused to swing toward the end wall 19 of the casing 16 and effect rocking of the rock shafts in one direction. When the rod 122 is slid outwards the arms 123 are caused to swing inwards away from the casing end wall 19 and thus effect reverse rocking or turning of the rock shafts 94. By shifting the rod 122 the outlet and inlet valves may be adjusted so as to cause the carrier and the driven shaft to be driven at any desired speed. The plugs of the outlet and inlet valves are so arranged that when the control rod 122 is slid inwards the plugs for the outlet valves move toward their open position and the plugs of the inlet valves move or turn toward their closed position.

*Automatic control means for valve arrangement*

The means for automatically controlling the valve arrangement so as to maintain a substantially constant torque of the driven shaft 17 comprises a ring shaped piston 134, a bell crank 135 and a counterweight 136. The piston is connected to, and formed integrally with, a cylindrical skirt 137 and is slidably mounted in a cylindrical sleeve 138. The skirt 137 is disposed in the central portion of the bore 33 in the inner end of the driven shaft 17 and has one end thereof connected to, and formed integrally with, the outer end portion of the ring shaped plate 127. Because the piston 134 is connected to the skirt 137 and the latter is connected to the ring shaped plate 127 the sleeve 128 moves axially in response to sliding movement of the piston. The sleeve 138 surrounds the piston 134 and the skirt 137 and embodies at one end thereof an inwardly extending enlargement 139. The other end of the sleeve is provided with an outwardly extending annular flange 140 which fits against the inner end face of the shaft 17 and is secured to the shaft by an annular series of bolts 141. Longitudinal slots 142 are formed in the central portion of the sleeve 138. Such slots correspond in number to, and register with, the slots 133 in the inner end of the shaft 17 and accommodate the inner ends of the arms 123. The space between the piston 134 and the inwardly extending enlargement 139 constitutes a pressure chamber 143 and they communicate with the annular groove 68 by way of bleed ducts 144. The latter comprise outer passages 145 which are formed in the inner marginal portion of the body part 38 of the carrier and lead inwards from the groove 68. The bleed ducts also comprise inner passages 146 which are formed in the inner end of the shaft 17, lead inwards from the inner ends of the outer passages 145 and communicate with the pressure chamber 143 by way of holes 147 in the sleeve 138. By reason of the fact that the pressure chamber 143 is in communication with the annular groove 68 constituting part of the outlet ducts 64, the chamber is filled with fluid and the pressure of the fluid in the chamber is the same as that of the fluid in the outlet ducts and the piston is subject to pressure variations. The bell crank 135 is located outwards of the outer end of the driven shaft 17 and comprises a substantially horizontal arm 148 and an upstanding arm 149. It is mounted to swing in a vertical plane by way of a pivot pin 150 which extends through the elbow part of the bell crank and has the ends thereof mounted in holes in a pair of laterally spaced brackets 151 on the bearing 28. The arm 149 is bifurcated and straddles a circumferentially grooved collar 152 on the outer end of the rod 122. The outer extremities of the two parts of the arm 149 are provided with inwardly extending pins 153 which project into a circumferential groove in the collar 152. When the bell crank is swung in a counterclockwise direction as viewed in Figure 3, the rod 122 is shifted inwards and operates, through the medium of the arms 123 and the rock shafts 94, to turn the plugs of the outlet valves into their open position and to turn the plugs of the inlet valves into their closed position. When the bell crank 135 is swung in the opposite direction, i. e., in a clockwise direction as viewed in Figure 3, the rod 122 is slid outwards and operates to turn the plugs of the outlet valves into their closed position and to turn the plugs of the inlet valves into their open position. The counterweight 136 is mounted on the arm 148 of the bell crank so that it is adjustable longitudinally thereof. A set screw 154 serves releasably to lock the counterweight in its various adjusted positions. The counterweight operates through the medium of the bell crank 135 and the rod 122, to urge the piston 134 towards the enlargement 139. Such control movement on the part of the counterweight is counteracted during operation of the coupling by the pressure of the fluid in the pressure chamber 143. The counterweight and piston coact automatically to control the valves of the valve arrangement so as to maintain a substantially constant torque so far as the driven shaft 17 is concerned. By adjusting the counterweight 136 on the arm 148 of the bell crank the coupling may be set to provide any desired substantially constant torque of the shaft 17. When the coupling is set to maintain a predetermined constant torque of the shaft and there is an increase in the pressure of the fluid in the outlet ducts for any reason whatsoever, such, for example, as may occur in connection with increased rotational speed of the casing 16, the piston 134 moves away from the enlargement 139 and effects increased opening of the outlet valves 70. Such increased opening of the outlet valves results in less resistance to the pumping action of the planetary pinions 37 and resultant diminution of the speed of drive of the driven shaft 17. Should, in connection with a predetermined setting of the counterweight 136, the pressure of the fluid in the pressure chamber 143 decrease due to reduced speed of drive of the casing 16, or any other reason, the piston 134, due to the action of the counterweight, moves towards the enlargement 139 and effects additional partial closing of the outlet valves. Such additional partial closing on the part of the outlet valves results in decrease in flow of fluid through the outlet ducts and this in turn builds up resistance on the pressure side of the pinions and increases drive of the shaft 17. Because of the automatic control of the valve arrangement by the piston 134 which is responsive to variations in the pressure of the fluid in the discharge ducts the torque of the driven shaft 17 will be substantially constant. If an increased torque is desired the counterweight is shifted outwards on the arm 148 of the bell crank 135. To effect a decrease in torque of the shaft 17 the counterweight 136 is inwardly adjusted with respect to the bell crank arm 138. By adjusting the position of the counterweight the coupling, as previously pointed out, may be set to maintain any desired substantially constant torque so far as the driven shaft 17 is concerned.

*Additional structure*

In addition to the parts heretofore described the coupling comprises an annular baffle 155. This baffle surrounds the outlet valves 70 and extends between the end plate 39 of the carrier and the end wall 19 of the casing. The inner end of the baffle is provided with an outwardly extending flange 156 and this fits against the carrier end plate 39 and is secured thereto by way of bolts 157 (see Figure 4). Directly inwards of the baffle 155 the carrier 36 is provided with cross bores 158. These cross bores permit the fluid which is discharged from the outlet valves 70 to circulate or pass from the space between the carrier end plate 39 and the casing end wall 19 to the space between the carrier end plate 40 and the casing end wall 20. The annular baffle 155 serves to deflect or direct the exhaust fluid from the outlet valves into the cross bores 158. The latter, as shown in Figure 5, are arranged in an annular series. The baffle 155 is provided with holes 159 and the intermediate sections 97 of the rock shafts 94 extend through these holes. The stub shafts 49 for the planetary pinions 37 have longitudinally extending centrally disposed open ended bores 160 which permit the fluid (solid liquid) in the outer portion of the space between the carrier end plate 40 and the casing end wall 20 to circulate back to the outer portion of the space between the carrier end plate 39 and the casing end wall 19 where it is in a position to enter into the ports 91 and 92 of the inlet valves 71. By permitting the fluid to circulate from one side of the carrier to the other and then back again the pressure of the fluid on one side of the carrier equals that of the fluid on the other side of the carrier. In addition, cooling of the fluid is effected.

The outer marginal portion of the end wall 39 of the carrier 36 is provided with an annular series of equidistantly spaced arcuate fairing blocks 161. These blocks are six in number and extend between the inlet valves 71. They are secured in place by screws 162 and abut against the outwardly extending annular flange 42 on the outer margin of the carrier end plate 39. The inner central portions of the fairing blocks 161 have arcuate cutouts 163 for accommodating the bearings 51. The fairing blocks 161 have a two-fold purpose or function in that they serve to house the inlet valves 71 and the bearings 51 and thus reduce drag or resistance to a minimum, and also serve to reduce the thickness of the space that is directly inwards of the outer margin of the casing end wall 19 and thus cause the liquid to spread out and cool before it enters the inlet ports of the inlet valves.

The outer marginal portion of the carrier end plate 40 is provided with an annular series of arcuate fairing blocks 164. The latter are secured in place by screw 165 and abut against the inner face of the outwardly extending annular flange 44 on the outer marginal portion of the carrier end plate 40. The ends of the blocks 164 are in abutment and the central inner portions of the blocks are provided with arcuate cutouts 166 for accommodating the bearings 55 for the stub shafts of the planetary pinions. The blocks 164 function in the same manner as the fairing blocks 161 in that they serves as a streamlining instrumentality for reducing drag or resistance and also serve to spread out the liquid for cooling purposes directly before it enters the longitudinally extending centrally disposed bores 160 in the stub shafts for the planetary pinions.

In order to reduce the load on the bearings for the pinion carrying stub shafts 49 the body part 38 of the carrier 36 is provided with a set of grooves 167 and a set of grooves 168. The grooves 167 correspond in number to the arcuate cavities 41 for the planetary pinions. They are formed in the side face of the body part of the carrier that is opposite the carrier end plate 39 and extend between, and communicate with, the arcuate cavities 41 and the annular grooves 68. The outer ends of the grooves 167, i. e., the ends that lead to, and communicate with, the cavities 41, are located substantially diametrically opposite the trailing portions of the cavities with the result that the portions of the pinions that are diametrically opposite the pressure sides of the pinions are subjected to the same fluid pressure as said pressure sides of the pinions. In other words, the pinions are subjected to balancing pressures with the result that the load on the bearings for the pinion carrying stub shafts is reduced to a minimum. The grooves 168 correspond in number to the cavities 41 for the planetary pinions and are formed in the side part of the side face of the carrier body part that is opposite the carrier end plate 40. They extend substantially radially and have the inner ends thereof in communication with the air inlet passages 62 of the inlet ducts 58. The outer ends of the grooves 168 lead to, and communicate with, the cavities 41 at points diametrically opposite the leading portions of the cavities. By employing the grooves 168 the pressure on the suction sides of the pinions is the same as that on the portions of the pinions that are diametrically opposite the suction sides and loading of the bearings for the pinion carrying stub shafts is reduced.

Operation

When it is desired to use the coupling the bell crank 135 is swung upwards manually or otherwise so as to cause the rod 122 so to rock the shafts 94 as fully to open the outlet valves 70 and fully to close the inlet valves 71 for the liquid receiving branches of the inlet ducts. Thereafter the prime mover is started so as to effect drive of the casing 16. When the valves are set, as previously pointed out, and the casing is rotated by the prime mover the carrier 36 and the driven shaft 17 remain stationary or idle. This is attributable to the fact that the outlet ducts 64 leading from the pressure sides of the planetary pinions are unrestricted and hence the planetary pinions rotate freely in the arcuate cavities 41. When the carrier and driven shaft are stationary during drive of the casing only air from the central portion of the casing is admitted to the suction sides of the pinions in view of the fact that the inlet valves 71 are closed. When it is desired to effect drive of the driven shaft 17 the bell crank 135 is swung downwards so as either partially to close the outlet valves and partially to open the inlet valves or fully to close the outlet valves and fully to open the inlet valves. As soon as the valves are in an intermediate position liquid from the ring-shaped body within the side wall of the casing enters the inlet ducts 58 via the liquid receiving branches under control of the inlet valves and the outlet ducts are restricted because of the setting of the plugs of the outlet valves. Because of the resistance to the pumping action of the pinions due to partial restriction of the outlet ducts while the valves are in their intermediate position the pinions are caused so to revolve as to effect drive of the carrier and the driven shaft. When the outlet valves are in their fully closed position and the inlet valves are hence in their fully open position flow of liquid through the outlet ducts is precluded with the result that the planetary pinions are held against rotation relatively to the carrier and the carrier and shaft are positively driven from the casing. When the valves are in their intermediate position wherein there is a partial flow of liquid through the outlet ducts and the carrier and shaft are thus caused to revolve at a reduced speed, the liquid which is pumped by the pinions and is discharged via the outlet ports of the outlet valves flows outwards against the annular baffle 155, then flows through the cross bores 158 in the carrier, then flows outwards in the outer portion of the space between the carrier end plate 40 and the casing end wall 20, then flows back via the bores 160 in the pinion carrying stub shafts, and then enters the inlet ports of the inlet valves. Because of the manner in which the liquid circulates efficient cooling of the liquid is effected and the pressure on opposite sides of the carrier is equalized. When it is desired to operate the coupling so that the torque of the driven shaft 17 is substantially constant the bell crank 135 is released so as to bring into play the counterweight 136 and the piston 134. The piston, as heretofore pointed out, responds to variations in the pressure of the fluid in the outlet ducts and operates through the medium of the rod 122, the arms 128 and the rock shafts 94 automatically to control the valves and thus provide a substantially constant torque so far as the driven shaft is concerned. Variation in the amount of torque is effected by adjusting the counterweight 136 on the substantially horizontal arm 148 of the bell crank.

When it is desired to remove the outlet and inlet valves drive of the coupling is discontinued and the cover plates for the openings 75 and 86 are removed. After removal of the cover plates 87 for the openings 86 the bolts 85 are removed from the corner portions of the housings of the inlet valves and the inlet valves are disconnected from the intermediate sections 97 of the rock shafts by sliding the collars 117 inwards. After inward sliding of such collars the inlet valves are free so that they may be removed via the openings 86. Because there are but two openings 86 and the inlet valves are six in number the valves must be successively rotated into alignment with the openings 86 in connection with removal thereof. After removal of the inlet valves the intermediate rock shaft sections 97 are removed by sliding them outwards so as to disengage the inner ends of the collars 111 from the outer ends of the intermediate rock shaft sections 96. After removal of the rock shaft sections 97 the bolts 74 at the corner portions of the housings of the outlet valves are removed and the outlet valves are disconnected from the inner rock shaft sections 95 by shifting them outwards so as to disengage the inner ends of the collars 103 from the outer ends of the inner rock shaft sections 95. After outward shift of the outlet valves they are free and hence may be removed from the casing interior via the openings 75.

The herein described variable speed hydraulic coupling is characterized by exceptionally high efficiency and a novel arrangement of parts. It is essentially in the form of a self-contained unit and is further characterized by the fact that the valves may be removed without dismantling the casing. So far as use is concerned the subject coupling has many capabilities of use.

The invention is not to be understood as restricted to the details set forth since these may be modified within the scope of the appended claims without departing from the spirit and scope of the invention.

Having thus described the invention what I claim as new and desire to secure by Letters Patent is:

1. A variable speed hydraulic coupling comprising a rotatable cylindrical casing element provided with driving means therefor and adapted to contain a partial filling of liquid and in connection with drive thereof to have the liquid flung outwards around its side wall so that it forms a ring-shaped body around a central core of air; a driven element; a gear pump variety power transmission mechanism between the two elements, embodying a gear disposed in the casing element and connected to one of the elements, a planetary pinion in mesh with the gear, and a rotary carrier in the casing element connected to the other element, provided with a pinion retaining cavity facing the gear, having an inlet duct leading to the suction side of the pinion and provided with a liquid receiving branch leading from the outer portion of the casing interior and a constantly open air receiving branch leading from the central portion of the casing interior, and also having an outlet duct between the pressure side of the pinion and the casing interior; a valve mounted on the carrier and adapted to control the liquid receiving branch of the inlet duct; a second valve mounted on the carrier and adapted to control the outlet duct; and conjoint control means for the valves arranged so that the first mentioned valve is brought into its closed position when the second mentioned valve is brought into its open position.

2. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear, and a rotary carrier in the casing, connected to drive the element, provided with a pinion retaining cavity facing the gear, having an inlet duct leading to the suction side of the pinion and provided with a liquid receiving branch leading from the outer portion of the casing interior and a constantly open air receiving branch leading from the central portion of the casing interior, and also having an outlet duct between the pressure side of the pinion and the casing interior; a valve mounted on the carrier and adapted to control the liquid receiving branch of the inlet duct; a second valve mounted on the carrier and adapted to control the outlet duct; and conjoint control means for the valves arranged so that the first mentioned valve is brought into its closed position when the second valve is brought into its open position.

3. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear, and a rotary carrier in the casing, connected to drive the element, provided with a pinion retaining cavity facing the gear, having an inlet duct leading to the suction side of the pinion and provided with a liquid receiving branch with the inlet end thereof leading through the outer marginal portion of one side of the carrier and communicating with the outer portion of the casing interior and a constantly open air receiving branch leading from the central portion of the casing interior, and also having an outlet duct between the pressure side of the pinion and the central portion of the casing interior and with the discharge end thereof leading through the inner marginal portion of said one side of the carrier; a valve mounted on the outer marginal portion of said one side of the carrier and adapted to control the liquid receiving branch of said inlet duct; a second valve mounted on the inner marginal portion on said one side of the carrier and adapted to control the outlet duct; and conjoint control means for the valves including a part on said one side of the carrier, and arranged so that the first mentioned valve is brought into its closed position when said second valve is brought into its open position.

4. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear, and a rotary carrier in the casing, connected to drive the element, provided with a pinion retaining cavity facing the gear, having an inlet duct leading to the suction side of the pinion and provided with a liquid receiving branch with the inlet end thereof leading through the outer marginal portion of one side of the carrier and communicaing with the outer portion of the casing interior and a constantly open air receiving branch with the inlet end thereof leading through the inner marginal portion of the other side of the carrier and communicating with the central portion of the casing interior, and also having an outlet duct between the pressure side of the pinion and the central portion of the casing interior and with the discharge end thereof leading through the inner marginal portion of said one side of the carrier; a valve mounted on the outer marginal portion of said one side of the carrier and adapted to control the liquid receiving branch of said inlet duct; a second valve mounted on the inner marginal portion on said one side of the carrier and adapted to control the outlet duct; and conjoint control means for the valves including a part on said one side of the carrier, and arranged so that the first mentioned valve is brought into its closed position when said second valve is brought ino its open position.

5. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear, and a rotary carrier in the casing, connected to drive the element, provided with a pinion retaining cavity facing the gear, having an inlet duct leading to the suction side of the pinion and provided with a liquid receiving branch with the inlet end thereof leading through the outer marginal portion of one side of the carrier and communicating with the outer portion of the casing interior and a constantly open air receiving branch with the inlet end thereof leading through the inner marginal portion of the other side of the carrier and communicating with the central portion of the casing interior, and also having an outlet duct between the pressure side of the pinion and the central portion of the casing interior and with the discharge end thereof leading through the inner marginal portion of said one side of the carrier; a valve mounted on the outer marginal portion of said one side of the carrier and adapted to control the liquid receiving branch of said inlet duct; a second valve mounted on the inner marginal portion on said one side of the carrier and adapted to control the outlet duct; conjoint control means for the valves including a part on said one side of the carrier, and arranged so that the first mentioned valve is brought into its closed position when said second valve is brought into its open position; and means forming passages for permitting the fluid in the casing to circulate back and forth between opposite sides of the carrier.

6. A variable speed hydraulic coupling comprising a rotatable cylindrical casing element provided with driving means therefor and adapted to contain fluid; a driven element, a gear pump variety power transmission mechanism between the two elements, embodying a gear connected to one of the elements, a planetary pinion meshing with the gear and provided with a stub shaft therefor, a rotary carrier in the casing connected to the other element, provided with a pinion retaining cavity facing the gear and also with bearings at the sides thereof for the stub shaft, having an inlet duct between the casing interior and the suction side of the pinion, and also having an outlet duct between the pressure side of the pinion and the casing interior; a valve for controlling the outlet duct; and means for permitting the fluid in the casing to circulate back and forth between opposite sides of the carrier embodying a cross bore in the carrier and a longitudinal bore in the stub shaft of the planetary pinion.

7. A variable speed hydraulic coupling comprising a casing provided with driving means therefor and adapted to contain fluid; a driven element; a gear pump variety power transmission mechanism between the casing and the element, embodying a ring gear connected to the inner periphery of the casing side wall, a planetary pinion meshing with the gear and having a stub shaft therefor, and a rotary carrier in the casing, connected to drive the element, provided with a pinion retaining cavity facing the gear, and in addition bearings at the sides thereof for the stub shaft of the pinion, having an inlet duct between the casing interior and the suction side of the pinion, and also having an outlet duct between the pressure side of said pinion and the casing interior; a valve for controlling one of the ducts; and means for permitting the fluid in the casing to circulate back and forth between opposite sides of the carrier comprising a cross bore in the carrier and a longitudinally extending bore in the stub shaft of the pinion.

8. A variable speed hydraulic coupling comprising a rotatable cylindrical casing provided with driving means therefor and adapted to contain liquid; a driven element; a gear pump variety power transmission mechanism between the casing and the element, embodying a ring gear connected to the inner periphery of the casing side wall, a planetary pinion meshing with the gear, and a rotary carrier in the casing connected to drive the element, provided with a pinion retaining cavity facing the gear and having an inlet duct between the outer portion of the casing interior and the suction side of the pinion and also having an outlet duct between the pressure side of the pinion and the central portion of the casing interior and with the discharge end thereof leading through the inner marginal portion of one side of said carrier; a valve mounted on the inner marginal portion of said one side of the carrier and adapted to control the outlet duct; means for permitting liquid to circulate from one side of the carrier to the other embodying a cross bore in the carrier disposed outwards of the valve; and a baffle located outwards of the valve in the space between said one side of the carrier and the adjacent end wall of the casing and arranged to direct the liquid discharged by the valve into the cross bore.

9. A variable speed hydraulic coupling comprising a rotatable cylindrical casing provided with driving means therefor and adapted to contain liquid; a driven element; a gear pump variety power transmission mechanism between the casing and the element, embodying a ring gear connected to the inner periphery of the casing side wall, a planetary pinion meshing with the gear, and a rotary carrier in the casing connected to drive the element, provided with a pinion retaining cavity facing the gear, having an inlet duct leading to the suction side of the pinion and provided with a liquid receiving branch with the inlet end thereof leading through the outer marginal portion of one side of the carrier and communicating with the outer portion of the casing interior, and also having an outlet duct between the pressure side of the pinion and the central portion of the casing interior with the discharge end thereof leading through the inner marginal portion of said one side of the carrier; a valve mounted on the inner marginal portion of said one side of the carrier and adapted to control the outlet duct; means for permitting the liquid in the casing to circulate back and forth between opposite sides of the carrier including a cross bore in the carrier directly outwards of the valve; and an annular baffle mounted in the space between said one side of the carrier and the adjacent end wall of the casing located outwards of the cross bore and between the valve and the inlet end of the inlet duct and adapted to direct the liquid discharged from the valve into the cross bore.

10. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear, and a rotary carrier in the casing, connected to drive the element, provided with a pinion retaining cavity facing the gear, having an inlet duct leading to the suction side of the pinion and provided with a liquid receiving branch with the inlet end thereof leading through the outer marginal portion of one side of the carrier and communicating with the outer portion of the casing interior and a constantly open air receiving branch leading from the central portion of the casing interior, and also having an outlet duct between the pressure side of the pinion and the central portion of the casing interior and with the discharge end thereof leading through the inner marginal portion of said one side of the carrier; a valve mounted on the outer marginal portion of said one side of the carrier and adapted to control the liquid receiving branch of said inlet duct; a second valve mounted on the inner marginal portion on said one side of the carrier and adapted to control the outlet duct; conjoint control means for the valves including a part on said one side of the carrier, and arranged so that the first mentioned valve is brought into its closed position when said second valve is brought into its open position; means for permitting the liquid in the casing to circulate from said one side of the carrier to the other side and then back again and comprising a cross bore in the central portion of the carrier directly outwards of said second valve and a cross bore at the outer portion of the carrier; and an annular baffle located adjacent said one side of the carrier and between the two valves and arranged so that it directs into the first mentioned bore the liquid that is discharged from said second valve when the latter is in its open position.

11. A variable speed hydraulic coupling comprising a rotatable cylindrical casing provided with driving means therefor and adapted to contain liquid; a driven element; a gear pump variety power transmission mechanism between the casing and the element, embodying a ring gear connected to the inner periphery of the casing side wall, a planetary pinion meshing with the gear and having a stub shaft therefor, and a rotary carrier in the casing, connected to drive the element, provided at the outer portion thereof with a pinion retaining cavity facing the gear and with bearings for the stub shaft of the pinion, having an inlet duct leading to the suction side of the pinion and provided with a liquid receiving branch with the inlet end thereof leading through the outer marginal portion of one side of the carrier and communicating with the outer portion of the casing interior, and also having an outlet duct between the pressure side of the pinion and the central portion of the casing interior and with the discharge end thereof leading through the inner marginal portion of said side wall of the carrier; a valve mounted on the inner marginal portion of said one side of the carrier and adapted to control the outlet duct; and means for permitting the liquid in the casing to circulate back and forth between opposite sides of the carrier comprising a cross bore in the carrier located outwards of the valve but inwards of the bearings for the pinion stub shaft, and a longitudinal open ended bore in said pinion stub shaft.

12. A variable speed hydraulic coupling comprising a rotatable cylindrical casing provided with driving means therefor and adapted to contain liquid; a driven element; a gear pump variety power transmission mechanism between the casing and the element, embodying a ring gear connected to the inner periphery of the casing side wall, a planetary pinion meshing with the gear and having a stub shaft therefor, and a rotary carrier in the casing, connected to drive the element, provided at the outer portion thereof with a pinion retaining cavity facing the gear and with bearings for the stub shaft of the pinion, having an inlet duct leading to the suction side of the pinion and provided with a liquid receiving branch with the inlet end thereof leading through the outer marginal portion of one side of the carrier and communicating with the outer portion of the casing interior, and also having an outlet duct between the pressure side of the pinion and the central portion of the casing interior and with the discharge end thereof leading through the inner marginal portion of said side wall of the carrier; a valve mounted on the inner marginal portion of said one side of the carrier and adapted to control the outlet duct; means for permitting the liquid in the casing to circulate back and forth between opposite sides of the carrier comprising a cross bore in the carrier located outwards of the valve but inwards of the bearings for the pinion stub shaft, and a longitudinal open ended bore in said pinion stub shaft; and an annular baffle disposed adjacent said one side wall of the carrier and directly outwards of the valve and arranged to direct into the cross bore in the crrier the liquid that is discharged by the valve when the latter is open.

13. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear and having a stub shaft therefor, and a rotary carrier in the casing connected to drive the element, provided at its outer marginal portion with a pinion retaining cavity facing the gear and also with bearings for the stub shaft, having an inlet duct leading to the suction side of the pinion and provided with a liquid receiving branch with the inlet end thereof leading through the outer marginal portion of one side of the carrier and communicating with the outer portion of the casing interior and a constantly open air receiving branch with the inlet end thereof leading through the inner marginal portion of the other side of the carrier and communicating with the central portion of the casing interior, and also having an outlet duct between the pressure side of the pinion and said central portion of the casing interior and with the discharge end thereof leading through the inner marginal portion of said one side of the carrier; a valve mounted on the outer marginal portion of said one side of the carrier and adapted to control the liquid receiving branch of said inlet duct; a second valve mounted on the inner marginal portion of said one side of the carrier and adapted to control the outlet duct; conjoint control means for the valves arranged so that the first mentioned valve is brought into its closed position when said second valve is brought into its open position; and means for permitting the liquid in the casing to circulate back and forth between opposite sides of the carrier embodying a cross port in the carrier disposed outwards of said second valve but inwards of the bearings for the pinion stub shaft, and a longitudinally extending open ended bore in said pinion stub shaft.

14. A variable speed hydraulic coupling comprising a rotatable cylindrical casing provided with driving means therefor and adapted to contain a partial filling of liquid and in connection with drive thereof to have the liquid flung outwards around its side wall so that it forms a ring shaped body around a central core of air; a driven element; a gear pump variety power transmission mechanism between the casing and the element, embodying a ring gear connected to the inner periphery of the casing side wall, a planetary pinion meshing with the gear and having a stub shaft therefor, and a rotary carrier in the casing connected to drive the element, provided at its outer marginal portion with a pinion retaining cavity facing the gear and also with bearings for the stub shaft, having an inlet duct leading to the suction side of the pinion and provided with a liquid receiving branch with the inlet end thereof leading through the outer marginal portion of one side of the carrier and communicating with the outer portion of the casing interior and a constantly open air receiving branch with the inlet end thereof leading through the inner marginal portion of the other side of the carrier and communicating with the central portion of the casing interior, and also having an outlet duct between the pressure side of the pinion and said central portion of the casing interior and with the discharge end thereof leading through the inner marginal portion of said one side of the carrier; a valve mounted on the outer marginal portion of said one side of the carrier and adapted to control the liquid receiving branch of said inlet duct; a second valve mounted on the inner marginal portion of said one side of the carrier and adapted to control the outlet duct; conjoint control means for the valves arranged so that the first mentioned valve is brought into its closed position when said second mentioned valve is brought into its open position; means for permitting the liquid in the casing to circulate back and forth between opposite sides of the carrier embodying a cross port in the carrier disposed outwards of said second valve but inwards of the bearings for the pinion stub shaft, and a longitudinally extending open ended bore in said pinion stub shaft; and an annular baffle connected to said one side of the carrier, positioned between the two valves and arranged so as to direct into the cross bore in the carrier the liquid that is discharged from said second valve when the latter is open.

15. A variable speed hydraulic coupling comprising a rotatable cylindrical casing element provided with driving means therefor, adapted to contain fluid, and having a cover-plate closed opening in one of its end walls; a driven element; a gear pump variety power transmission mechanism in the casing element arranged operatively to connect the two elements and embodying a gear connected to one of the elements, a planetary pinion meshing with the gear, and a rotary carrier connected to the other element, provided with a pinion retaining cavity facing the gear and having an inlet duct leading from the casing interior to the suction side of the pinion, and an outlet duct between the pressure side of the pinion and the casing interior with the discharge end thereof leading through the side of the carrier that is adjacent said one end wall of the casing element; and a valve for controlling the outlet duct mounted removably on said one side of the carrier and arranged so that it is accessible via the opening upon removal of the cover-plate therefor.

16. A variable speed hydraulic coupling comprising a rotatable cylindrical casing element provided with driving means therefor, adapted to contain fluid, and having a cover-plate closed opening in one of its end walls; a driven element; a gear pump variety power transmission mechanism in the casing element arranged operatively to connect the two elements and embodying a gear connected to one of the elements, a planetary pinion meshing with the gear, and a rotary carrier connected to the other element and provided with a pinion retaining cavity facing the gear, having an inlet duct between the pressure side of the pinion and the casing interior and with the inlet end thereof leading through the side of the carrier that is adjacent said one end of the casing element, and also having an outlet duct between the pressure side of the pinion and said casing element interior; and a valve for controlling the inlet duct removably mounted on said one side of the carrier and arranged so that it is accessible via the opening in said one end wall of the casing upon removal of the cover-plate therefor.

17. A variable speed hydraulic coupling comprising a rotatable cylindrical casing element provided with driving means therefor, adapted to contain fluid and having in the outer marginal portion of one end wall thereof a cover-plate closed opening and also having in the inner marginal portion of said one end wall a cover-plate closed opening; a driven element; a gear pump variety power transmission mechanism in the casing element arranged operatively to connect the two elements and embodying a gear connected to one of the elements, a planetary pinion meshing with the gear, and a rotary carrier connected to the other element, provided with a pinion retaining cavity facing the gear, having an inlet duct between the suction side of the pinion and the outer portion of the casing interior and with the inlet end thereof leading through the outer marginal portion of the side of the carrier that is adjacent said one side of the casing element, and also having an outlet duct between the pressure side of the pinion and the central portion of the casing interior and with the discharge end thereof leading through the inner marginal portion of said one side of the casing; an inlet valve for controlling the inlet duct removably mounted on the outer marginal portion of said one side of the carrier and accessible via the opening in the outer marginal portion of said one end wall of the casing element upon removal of the cover-plate therefor; and an outlet valve for controlling the outlet duct removably mounted on the inner marginal portion of said one side of the carrier and accessible via the opening in the inner marginal portion of said end wall of the casing element upon removal of the cover-plate therefor.

18. A variable speed hydraulic coupling comprising a rotatable cylindrical casing element provided with driving means therefor, adapted to contain fluid and having in the outer marginal portion of one end wall thereof a cover-plate closed opening and also having in the inner marginal portion of said one end wall a cover-plate closed opening; a driven element; a gear pump variety power transmission mechanism in the casing element arranged operatively to connect the two elements and embodying a gear connected to one of the elements, a planetary pinion meshing with the gear, and a rotary carrier connected to the other element, provided with a pinion retaining cavity facing the gear, having an inlet duct between the suction side of the pinion and the outer portion of the casing interior and with the inlet end thereof leading through the outer marginal portion of the side of the carrier that is adjacent said one side of the casing element, and also having an outlet duct between the pressure side of the pinion and the central portion of the casing interior and with the discharge end thereof leading through the inner marginal portion of said one side of the casing; an inlet valve for controlling the inlet duct removably mounted on the outer marginal portion of said one side of the carrier and accessible via the opening in the outer marginal portion of said one end wall of the casing element upon removal of the cover-plate therefor; an outlet valve for controlling the outlet duct removably mounted on the inner marginal portion of said one side of the carrier and accessible via the opening in the inner marginal portion of said end wall of the casing element upon removal of the cover-plate therefor; and conjoint control means for the two valves including a sectional shaft mounted on said one side of the carrier.

19. A variable speed hydraulic coupling comprising a rotatable casing element provided with driving means therefor and adapted to contain fluid; a driven element; a gear pump variety power transmission mechanism in the casing element arranged operatively to connect the two elements and embodying a gear connected to one of the elements, a planetary pinion meshing with the gear, a rotary carrier connected to the other element, provided with a pinion retaining cavity facing the gear, having an inlet duct leading from the casing interior to the suction side of the pinion, and also having an outlet duct leading from the pressure side of the pinion to the casing interior; a plug type valve mounted on one side of the carrier and adapted to control one of the ducts; and means for actuating the valve including a rock shaft mounted adjacent and in parallel relation with said one side of the carrier, having one end thereof projecting towards the central portion of the casing interior and provided with a fixed radially extending arm, and a slidably mounted rod extending into said central portion of the casing interior and operatively connected to the distal end of the arm.

20. A variable speed hydraulic coupling comprising a rotatable casing provided with driving means therefor and adapted to contain fluid; a hollow rotatably mounted shaft having one end thereof extending into the central portion of the casing and provided with a longitudinal slot; a gear pump variety power transmission mechanism in the casing arranged operatively to connect the casing and shaft and embodying a ring gear connected to the casing side wall, a planetary pinion meshing with the gear, and a rotary carrier connected to said one end of the shaft, provided with a pinion retaining cavity facing the gear, having an inlet duct leading from the casing interior to the suction side of the pinion, and also having an outlet duct between the pressure side of the pinion and said casing interior; a valve mounted on one side of the carrier and adapted to control one of the ducts; and means for actuating the valve including a rock shaft disposed adjacent and in parallel relation with said one side of the carrier, arranged so that one end thereof is adjacent said one end of the shaft, and provided with a radially extending arm projecting through the slot into the shaft interior, and a slide rod extending longitudinally through the shaft and connected operatively to the distal end of the arm.

21. A variable speed hydraulic coupling comprising a cylindrical casing provided with driving means therefor, adapted to contain fluid, and having a cover-plate closed opening in one of its end walls; a driven element; a gear pump variety power transmission mechanism in the casing arranged operatively to connect the casing and element and embodying a ring gear connected to the inner periphery of the casing side wall; a planetary pinion meshing with the gear; and a rotatable carrier connected to drive the element, provided with a pinion retaining cavity facing the gear and having an inlet duct between the casing interior and the pressure side of the pinion and an outlet duct between the pressure side of the pinion and said casing interior; a plug type valve for controlling one of the ducts mounted removably on the side of the carrier that is opposite said one end wall of the casing and arranged so that it is accessible via the opening upon removal of the cover-plate therefor; and means for actuating the valve including a rock shaft positioned adjacent and in parallel relation with said one side of the casing, formed of a plurality of readily separable sections and having one of the sections connected to the plug of the valve and another section extending inwards toward the central portion of the casing and provided with a radially extending arm, and a longitudinally slidable rod extending into said central portion of the casing and operatively connected to the distal end of the arm.

22. A variable speed hydraulic coupling comprising a rotatable cylindrical casing provided with driving means therefor, adapted to contain fluid, and having a cover-plate closed opening in one of its end walls; a hollow rotatably mounted drive shaft having one end thereof extending into the central portion of the casing and provided with a longitudinal slot; and a gear pump variety power transmission mechanism in the casing, arranged operatively to connect the casing and shaft and embodying a ring gear connected to the casing side wall, a planetary pinion meshing with the gear, and a rotary carrier connected to said one end of the shaft, provided with a pinion retaining cavity facing the gear, having an inlet duct leading from the casing interior to the suction side of the pinion, and also having an outlet duct between the pressure side of the pinion and said casing interior; a plug type valve for controlling one of the ducts, mounted removably on the side of the carrier that faces said one end wall of the casing and arranged so that it is accessible via said opening upon removal of the cover-plate therefor; and means for actuating the valve including a rock shaft positioned adjacent and in parallel relation with said one side of the carrier, formed of separable sections and having one section thereof connected to the plug of the valve and another section extending in the direction of said one end of the shaft and provided with a radial arm extending through the slot and into the shaft, and a slide rod extending longitudinally through the shaft and operatively connected to the distal end of the arm.

23. A variable speed hydraulic coupling comprising a rotatable cylindrical casing provided with driving means therefor and adapted to contain fluid; a driven element; a gear pump variety power transmission mechanism in the casing serving operatively to connect the casing and element and embodying a ring gear connected to the inner periphery of the casing side wall, a plurality of equidistantly spaced planetary pinions meshing with the gear, and a rotary carrier connected to drive the element, provided at its outer marginal portion with pinion retaining cavities facing the gear, and having inlet ducts between the casing interior and the suction sides of the pinions and outlet ducts between the pressure sides of the pinions and said casing interior; a plurality of valves adapted to control one set of ducts, corresponding in number to the pinions and mounted on the outer marginal portion of one side of the carrier; and an annular series of arcuate fairing blocks mounted on the outer marginal portion of said one side of the carrier and fitting between, and serving partially to house, the valves.

24. A variable speed hydraulic coupling comprising a driving element; a driven element, a gear pump variety power transmission mechanism serving operatively to connect the two elements and embodying a gear connected to one of the elements, a rotary carrier connected to the other element and having a cavity facing the gear, a planetary pinion mounted in the cavity and meshing with said gear, means forming an inlet duct between a source of fluid and the suction side of the pinion, and means forming an outlet duct between the pressure side of said pinion and said source; valve means for controlling the flow of fluid through one of the ducts; and means forming a passage between the inlet duct and that portion of the cavity that is substantially diametrically opposite the suction side of the pinion.

25. A variable speed hydraulic coupling comprising a driving element; a driven element, a gear pump variety power transmission mechanism serving operatively to connect the two elements and embodying a gear connected to one of the elements, a rotary carrier connected to the other element and having a cavity facing the gear, a planetary pinion mounted in the cavity and meshing with said gear, means forming an inlet duct between a source of fluid and the suction side of the pinion, and means forming an outlet duct between the pressure side of said pinion and said source; valve means for controlling the flow of fluid through one of the ducts; and means forming a passage between the outlet duct and that portion of the cavity that is substantially diametrically opposite the pressure side of the pinion.

26. A variable speed hydraulic coupling comprising a driving element; a driven element, a gear pump variety power transmission mechanism serving operatively to connect the two elements and embodying a gear connected to one of the elements, a rotary carrier connected to the other element and having a cavity facing the gear, a planetary pinion mounted in the cavity and meshing with said gear, means forming an inlet duct between a source of fluid and the suction side of the pinion, and means forming an outlet duct between the pressure side of said pinion and said source; valve means for controlling the flow of fluid through one of the ducts; means forming a passage between the inlet duct and that portion of the cavity that is substantially diametrically opposite the suction side of the pinion; and means forming a passage between the outlet duct and that portion of the cavity that is substantially diametrically opposite the pressure side of the pinion.

27. A variable speed hydraulic coupling comprising a rotatable casing element provided with driving means therefor, and adapted to contain fluid; a hollow driven shaft having one end thereof extending into the central portion of the casing and provided with an internal annular enlargement; a gear pump variety power transmission mechanism in the casing serving operatively to connect the casing and shaft and embodying a ring gear connected to the inner periphery of the casing side wall, a planetary pinion meshing with the gear, and a rotary carrier mounted on, and fixedly connected to, said one end of the shaft, provided with a pinion retaining cavity facing the gear, and having an inlet duct between the casing interior and the suction side of the pinion and an outlet duct between the pressure side of the pinion and said casing interior; a valve for controlling the flow of fluid through the outlet duct; and mechanism operative automatically during operation of the coupling to actuate the valve so as to maintain a substantially constant torque of the shaft and embodying an axially slidable sleeve-like part operatively connected to the valve, disposed in said one end of the shaft, having sliding engagement with said enlargement and provided with an external annular piston positioned in spaced relation with said enlargement so as to form therewith a pressure chamber, means establishing communication between the outlet duct and said pressure chamber whereby the piston is subjected to variations in the pressure of the fluid in said outlet duct, and means for subjecting the piston to a substantially constant force in opposition to the pressure of the fluid in the pressure chamber.

GEORGE E. BOCK.